(12) United States Patent
Ko

(10) Patent No.: US 7,295,275 B2
(45) Date of Patent: Nov. 13, 2007

(54) IN-PLANE SWITCHING MODE LIQUID CRYSTAL DISPLAY DEVICE

(75) Inventor: Doo Hyun Ko, Seongnam-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 11 days.

(21) Appl. No.: 10/964,772

(22) Filed: Oct. 15, 2004

(65) Prior Publication Data

US 2005/0140899 A1 Jun. 30, 2005

(30) Foreign Application Priority Data

Dec. 26, 2003 (KR) ............... 10-2003-0097619
Oct. 12, 2004 (KR) ............... 10-2004-0081393

(51) Int. Cl.
*G02F 1/1343* (2006.01)
(52) U.S. Cl. .............................. 349/141; 349/38
(58) Field of Classification Search ............ 349/141, 349/38
See application file for complete search history.

(56) References Cited

U.S. PATENT DOCUMENTS

| | | | |
|---|---|---|---|
| 6,525,798 B1* | 2/2003 | Yamakita et al. ........... 349/141 |
| 6,608,662 B1* | 8/2003 | Hiroshi ....................... 349/141 |
| 6,618,109 B2* | 9/2003 | Hidehira et al. ............ 349/141 |
| 6,710,836 B2* | 3/2004 | Lee ............................. 349/141 |
| 2002/0047975 A1* | 4/2002 | Lee et al. ..................... 349/141 |
| 2003/0043327 A1 | 3/2003 | Aoyama et al. |

* cited by examiner

*Primary Examiner*—Toan Ton
(74) *Attorney, Agent, or Firm*—McKenna Long & Aldridge LLP

(57) ABSTRACT

An IPS mode LCD device includes a gate line on a substrate along one direction; a common electrode having a bent portion; a first disclination prevention pattern portion extended from the bent portion of the common electrode toward one side of the common electrode; a data line substantially perpendicular to the gate line; a thin film transistor at a crossing portion of the gate and data lines; a pixel electrode connected to a drain electrode of the thin film transistor, the pixel electrode having a bent portion and being formed substantially parallel to the common electrode; and a second disclination prevention pattern portion extended from a bent portion of the pixel electrode toward one side of the pixel electrode.

18 Claims, 6 Drawing Sheets

IN-PLANE SWITCHING MODE LIQUID CRYSTAL DISPLAY DEVICE

This application claims the benefit of the Korean Application No. P2003-97619 filed on Dec. 26, 2003 and No. P2004-81393 filed on Oct. 12, 2004, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to an In-Plane Switching (IPS) mode LCD device.

2. Discussion of the Related Art

Liquid crystal display (LCD) devices have been actively studied and researched because of their advantageous characteristics such as high contrast ratio, gray level, high picture quality and low power consumption. The LCD device is especially suitable as an ultra-thin display device such as a wall-mountable television. The LCD device has also attracted great attention as a display device that can be substituted for CRTs because the LCD device has a thin profile, light weight and low power consumption. As a result, the LCD device may be fabricated as a small panel and widely used for a mobile phone display.

Based upon the properties of liquid crystal and pattern structures there are various modes for LCD devices. Specifically, the LCD device may be categorized as a Twisted Nematic (TN) mode controlling liquid crystal director by applying a voltage after arrangement of liquid crystal director twisted at 90°, a multi-domain mode having a wide viewing angle by dividing one pixel into several domains, an Optically Compensated Birefringence (OCB) mode compensating a phase change of light according to a progressing direction of light by forming a compensation film on an outer surface of a substrate, an In-Plane Switching (IPS) mode forming an electric field parallel to two substrates by forming two electrodes on any one substrate, and a Vertical Alignment (VA) mode arranging a longitudinal (major) axis of liquid crystal molecule vertical to a plane of an alignment layer by using negative type liquid crystal and vertical alignment layer.

Among the various types of LCD devices, the IPS mode LCD device generally includes a color filter substrate and a thin film transistor array substrate facing each other, and a liquid crystal layer formed between the two substrates. The color filter substrate includes a black matrix layer for preventing light leakage, and an R/G/B color filter layer for realizing various colors on the black matrix layer. Also, the thin film transistor array substrate includes gate and data lines that cross to define a pixel region, a switching device formed at a crossing point of the gate and data lines, and common and pixel electrodes formed in an alternating pattern to generate an electric field parallel to the two substrates.

Hereinafter, a related art IPS mode LCD device will be described with reference to the accompanying drawings. FIG. 1 illustrates a plan view of a related art IPS mode LCD device of having a 2-domain structure. FIG. 2 illustrates voltage distributions of a related art LCD device along I-I' of FIG. 1. FIG. 3A and FIG. 3B are plan views of an IPS mode LCD device when a voltage is turned on/off.

A thin film transistor array substrate of a related art IPS mode LCD device will be generally described as follows. As shown in FIG. 1, the thin film transistor array substrate includes a gate line 12, a data line 15, a thin film transistor TFT, a common line 25, a plurality of common electrodes 24, a plurality of pixel electrodes 17, and a capacitor electrode 26. The gate line 12 is formed in one direction on the thin film transistor array substrate, and the data line 15 is formed perpendicular to the gate line 12 to define a pixel region, wherein the data line 15 is formed to have a bent structure. Also, the thin film transistor TFT is formed at a crossing portion of the gate and data lines 12 and 15. Then, the common line 25 is formed parallel to the gate line 12 within the pixel region, and the plurality of common electrodes 24, each having a bent structure, extend from the common line 25. Also, the plurality of pixel electrodes 17 are connected to thin film transistor TFT, wherein each pixel electrode 17 is formed to have a bent structure that is parallel to the common electrodes 24, and provided between the common electrodes 24. The capacitor electrode 26 extended from the pixel electrode 17 overlaps the common line 25.

In addition, a gate insulating layer (not shown) is formed on an entire surface of the thin film transistor array substrate including the gate line 12, and a passivation layer (not shown) is formed on the entire surface of the thin film transistor array substrate including the data line 15.

The common line 25 is integrally formed with the common electrodes 24, and a gate electrode of the thin film transistor TFT is integrally formed with the gate line 12. Also, the common line 25, the common electrodes 24, the gate line 12, and the gate electrode are formed of a low-resistance metal on the same layer. The common electrode provided on the edge of the pixel region overlaps with the data line to prevent light leakage generated in the portion of the data line.

The pixel electrodes 17, extended from the capacitor electrode 26, are formed of a transparent conductive metal material having great transmittance, for example, indium-tin-oxide (ITO), wherein each pixel electrode 17 alternates with the common electrode 24. Also, the pixel electrode 17 is in contact with a drain electrode of the thin film transistor TFT, whereby the pixel electrode 17 receives a voltage.

As shown in FIG. 1, the common electrode 24 may alternate with the pixel electrode 17 in one direction. However, the common electrode 24 and the pixel electrode 17 may be formed in a zigzag type, to align liquid crystal molecules in two directions. That is, one domain of the pixel region may be divided into two parts to widen a viewing angle that is referred to as an S-IPS (Super-IPS) structure, the 2-domain IPS structure.

Also, a storage capacitor is formed of the capacitor electrode 26 overlapped with the common line 25, and the gate insulating layer and the passivation layer interposed between the capacitor electrode 26 and the common line 25. The storage capacitor maintains the voltage charged in the liquid crystal layer during turning off the thin film transistor TFT, thereby preventing degradation of picture quality.

In the related art IPS mode LCD device, as shown in FIG. 2, if 5V is applied to the common electrode 24, and 0V is applied to the pixel electrode 17, an equipotential surface is formed in parallel to the electrodes at the portions right on the electrodes, and the equipotential surface is formed perpendicular to the electrodes at the portion between the two electrodes. Accordingly, an electric field is perpendicular to the equipotential surface, whereby a horizontal electric field is formed between the common electrode 24 and the pixel electrode 17, a vertical electric field is formed on the respective electrodes, and both the horizontal and vertical electric fields are formed in the edge of the electrode.

An alignment of liquid crystal molecules in the related art IPS mode LCD device is controlled with the electric field. For example, as shown in FIG. 3A, if a sufficient voltage is applied to liquid crystal molecules 32 initially aligned at the same direction as a transmission axis of one polarizing sheet, long axes of the liquid crystal molecules 32 are aligned in parallel to the electric field. In case the dielectric anisotropy of the liquid crystal is negative, short axes of the liquid crystal molecules are aligned in parallel to the electric field.

More specifically, first and second polarizing sheets are formed on outer surfaces of the thin film transistor array substrate and the color filter substrate bonded to each other, wherein the transmission axes of the first and second polarizing sheets are perpendicular to each other. Also, an alignment layer formed on the lower substrate is rubbed parallel to the transmission axis of one polarizing sheet, whereby it is displayed on a normally black mode.

When voltage is not provided to the device, as shown in FIG. 3A, the liquid crystal molecules 32 are aligned to display the black state. Meanwhile, as shown in FIG. 3B, when voltage is provided to the device, the liquid crystal molecules 32 are aligned in parallel to the electric field, thereby displaying a white state. The common electrode 24 and the pixel electrode 17 are formed to have the bent structure, whereby the liquid crystal molecules 32 are aligned in two directions, thereby improving the viewing angle. However, because the liquid crystal molecules 32 are aligned in the different directions in the bent portion 'A' of the electrode, a disclination line may generate light leakage which degrades the picture quality.

SUMMARY OF THE INVENTION

Accordingly, the present invention is directed to an IPS mode LCD device that substantially obviates one or more problems due to limitations and disadvantages of the related art.

An advantage of the present invention is to provide an IPS mode LCD device to prevent disclination at bent portions of an electrode formed in a zigzag type and to improve storage capacitance.

Additional features and advantages of the invention will be set forth in the description which follows and in part will be apparent from the description or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an IPS mode LCD device includes a gate line on a substrate along one direction; a common electrode having a bent portion; a first disclination prevention pattern portion extended from the bent portion of the common electrode toward a one side of the common electrode; a first supplementary capacitor electrode extended from the bent portion of the common electrode toward a second side of the common electrode; a data line substantially perpendicular to the gate line; a thin film transistor at a crossing portion of the gate and data lines; a pixel electrode connected to a drain electrode of the thin film transistor, the pixel electrode being formed substantially in parallel to the common electrode; and a second disclination prevention pattern portion extended from a bent portion of the pixel electrode toward a first side of the pixel electrode, the second disclination pattern overlapping the supplementary capacitor electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, an IPS mode LCD device according to the present invention will be described with reference to the accompanying drawings.

Figure 1:
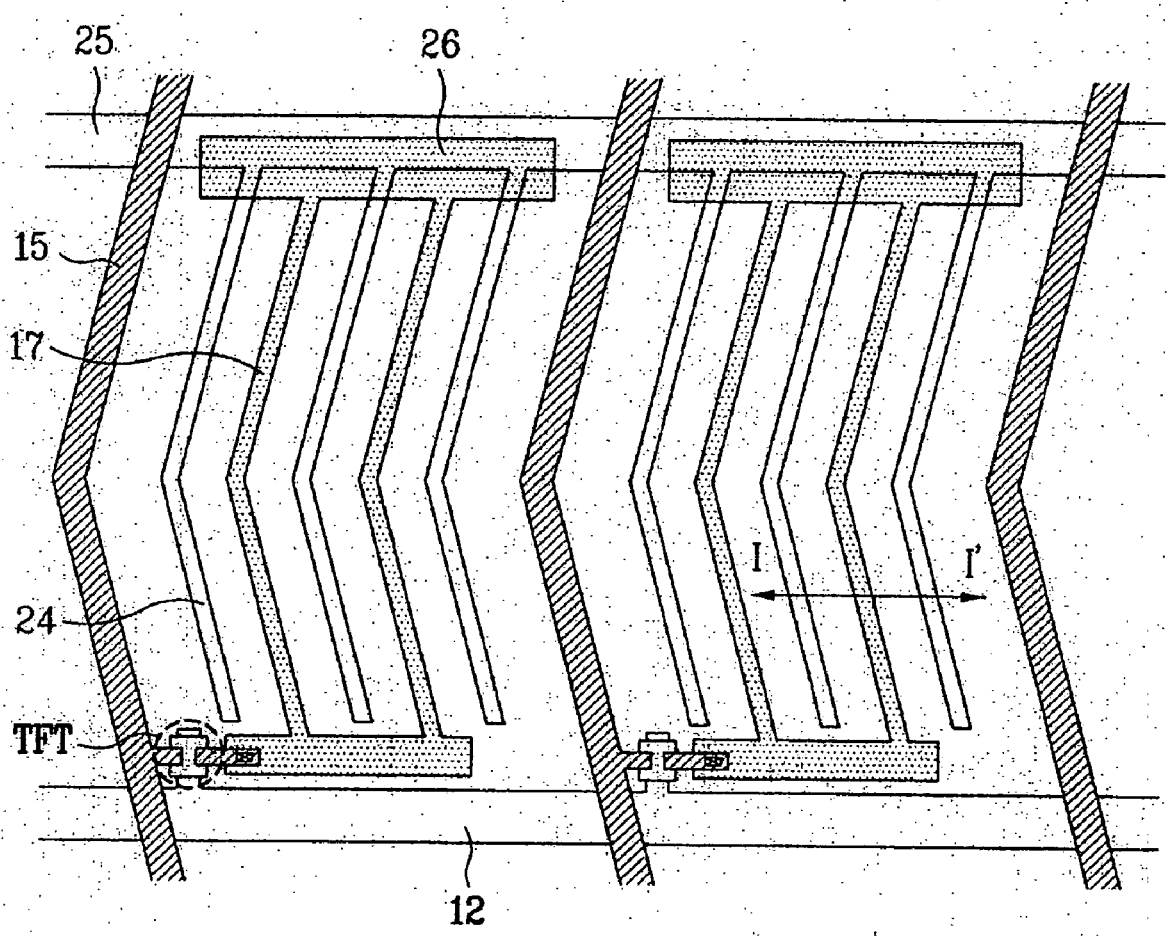
FIG. 1 is a plan view of a 2-domain IPS mode LCD device according to the related art.
Figure 2:
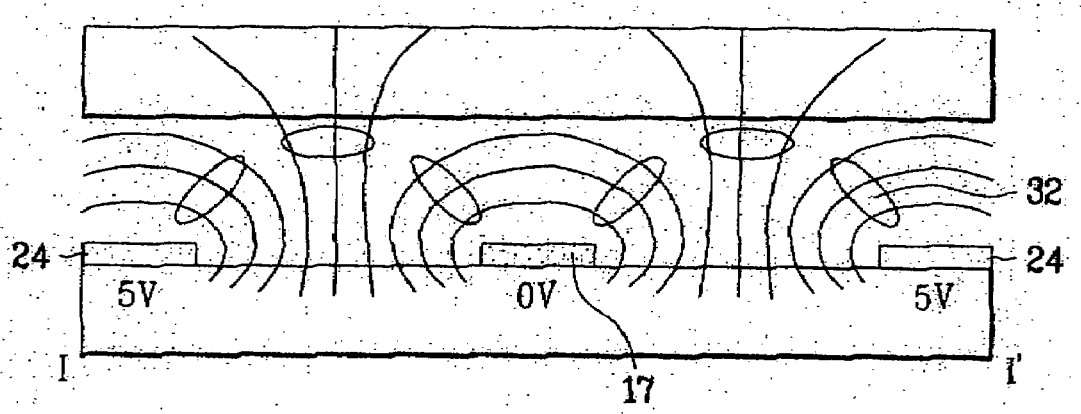
FIG. 2 illustrates voltage distribution of an IPS mode LCD device along I–I' of FIG. 1.
Figure 3A:
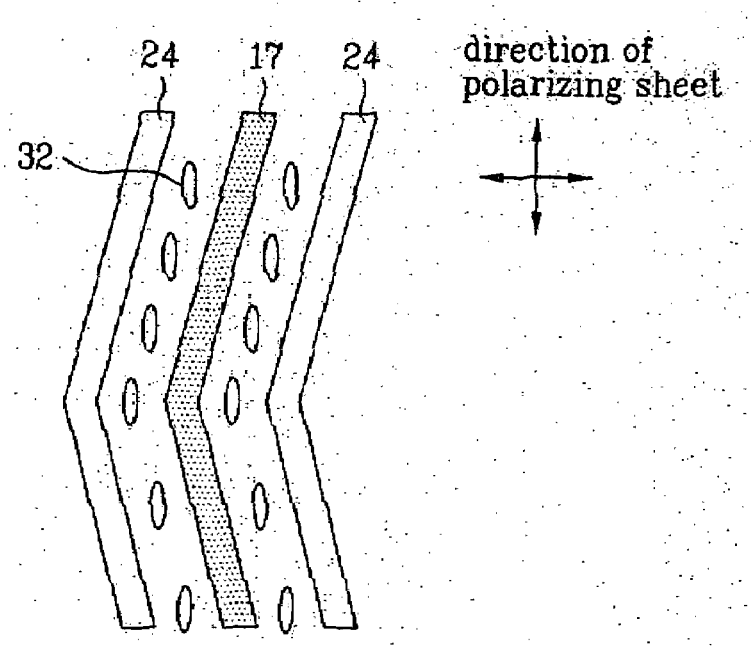
FIG. 3A and FIG. 3B are plan views of an IPS mode LCD device when a voltage is turned on and off.
Figure 3B:
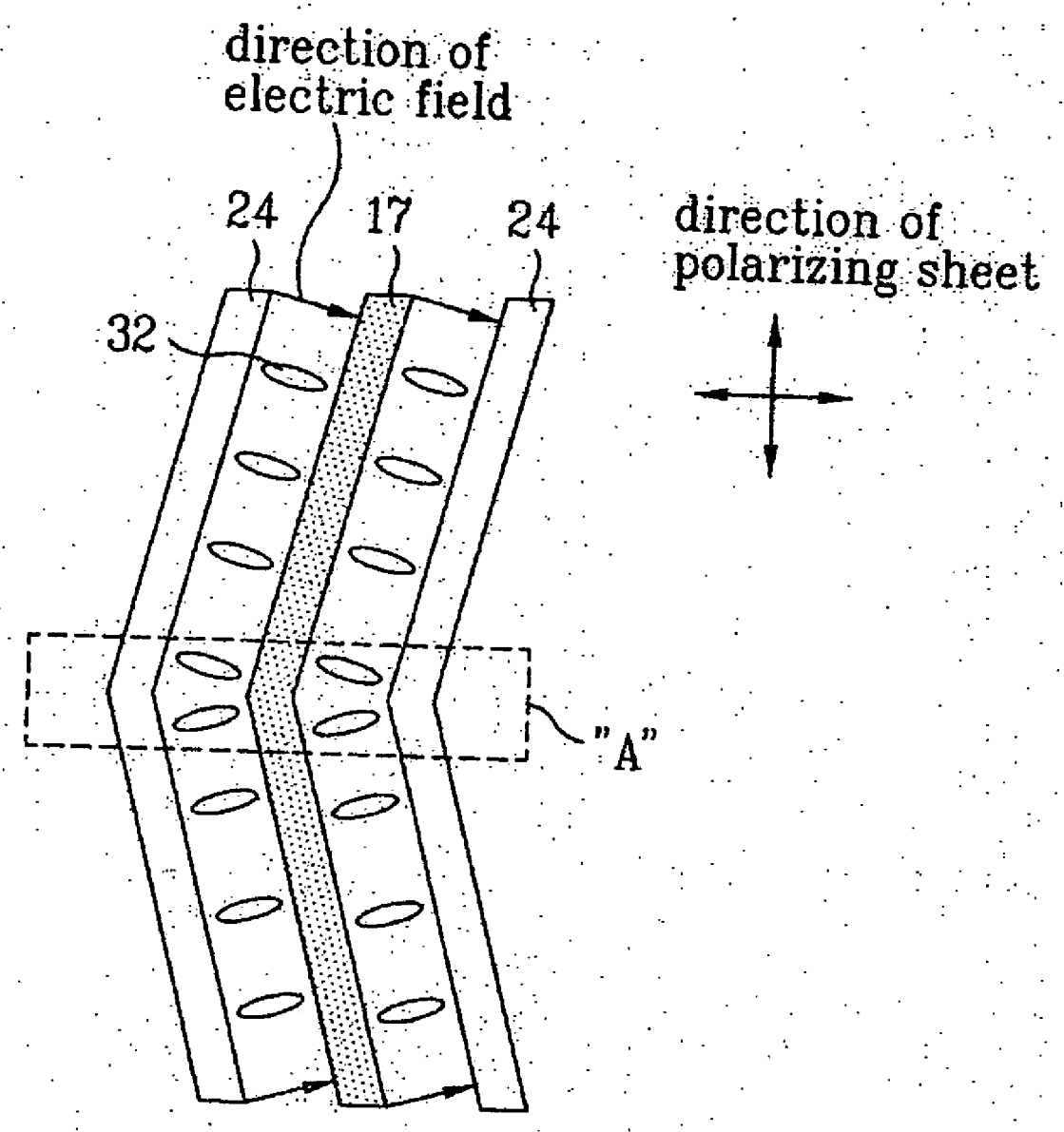
Figure 4:
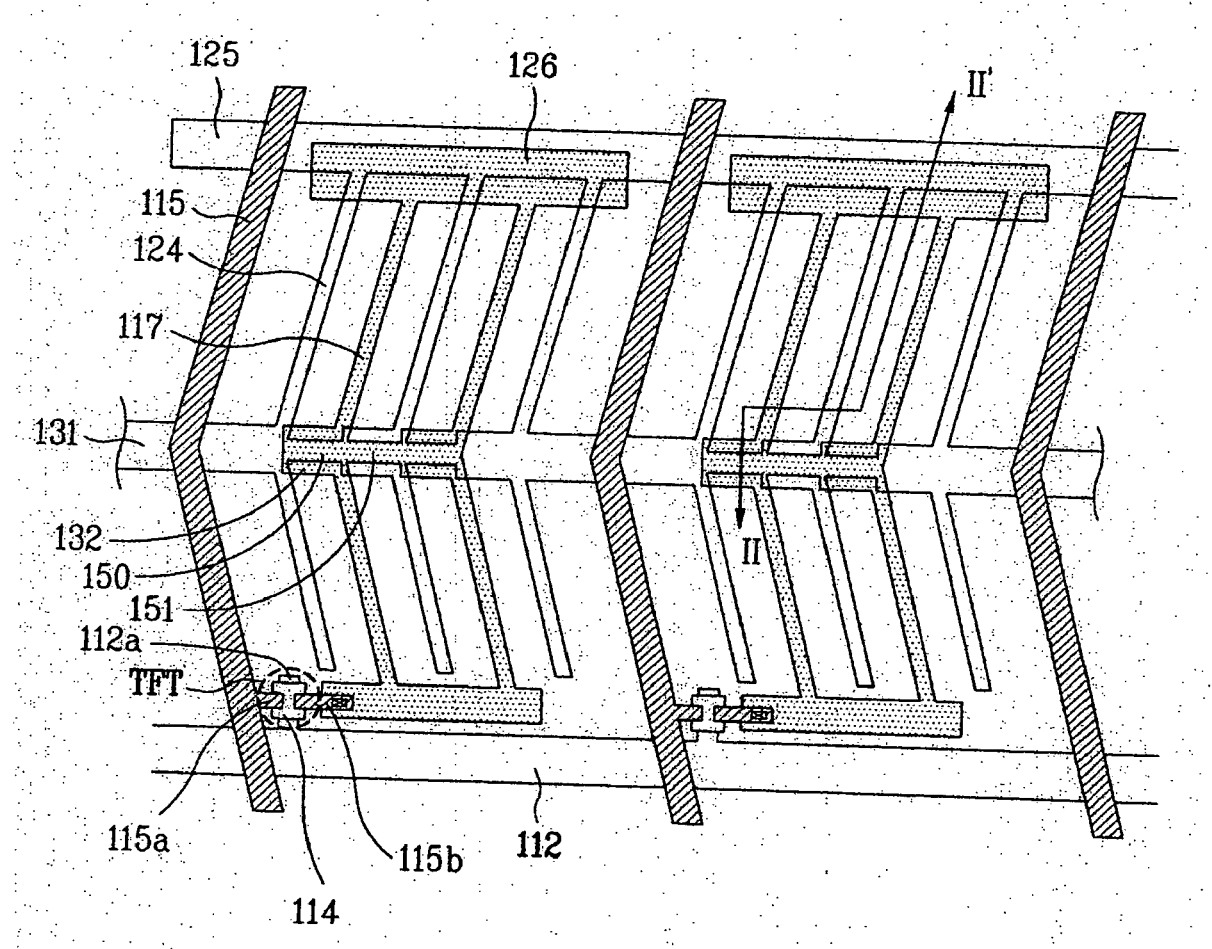
FIG. 4 is a plan view of an IPS mode LCD device according to the present invention.

As shown in FIG. 4, a thin film transistor array substrate of an IPS mode LCD device according to the present invention includes a gate line 112, a data line 115, a thin film transistor TFT, a common line 125, a plurality of common electrodes 124, a plurality of pixel electrodes 117, and a capacitor electrode 126. The gate line 112 is formed in one direction on the thin film transistor array substrate, and the data line 115 is formed substantially perpendicular to the gate line 112 to define a pixel region. Also, the data line 115 is formed to have a bent structure. Then, the thin film transistor TFT is formed at a crossing portion of the gate and data lines 112 and 115, and the thin film transistor TFT is switched to apply a voltage to a corresponding pixel region. The common line 125 is formed substantially parallel to the gate line 112, and receives a common voltage signal from a source external to an active area. The plurality of common electrodes 124 extend from the common line 125, wherein each common electrode 124 is formed to have a bent structure. Also, the pixel electrode 117 is connected to a drain electrode of the thin film transistor TFT, and the pixel electrode 117 is formed to have a bent structure and be substantially parallel to the common electrode 124. The capacitor electrode 126 extended from the pixel electrode 117 overlaps the common line 125.

Additionally, disclination prevention patterns are provided in the bent portion of the common electrode 124 and the pixel electrode 117. In order to prevent a disclination line in the bent portion of the electrode, the disclination prevention patterns are comprised of a first disclination prevention pattern portion 131 extended from the common electrode 124 toward one side, and a second disclination prevention pattern portion 132 extended from the pixel electrode 117 toward one side. Also, the first and second disclination prevention pattern portions 131 and 132 extend to the portion overlapped with the edge of the adjacent electrode.

When the voltage is applied to the first and second disclination prevention pattern portions 131 and 132, an electric field is generated between the adjacent electrodes, thereby controlling an alignment direction of liquid crystal molecules. That is, the liquid crystal molecules provided in the bent portion of the electrode are aligned in a predetermined direction by the electric field formed between the first disclination prevention pattern portion 131 and the adjacent pixel electrode 117, and the electric field formed between the second disclination prevention pattern portion 132 and the adjacent common electrode 124. Thus, it is possible to prevent the disclination line from generating in the bent portion of the electrode.

Figure 5:
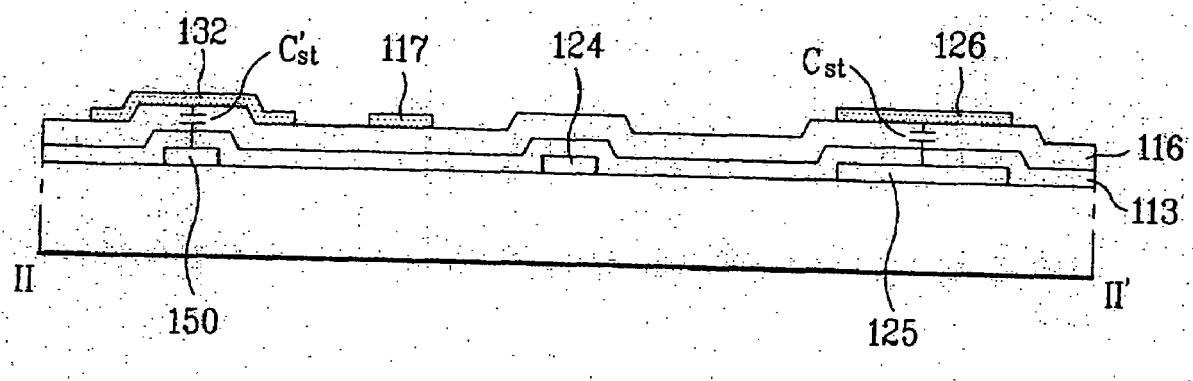
FIG. 5 is a cross sectional view of an IPS mode LCD device along II–II' of FIG. 4.

As shown in FIG. 5, a storage capacitor Cst is comprised of the capacitor electrode 126, the common line 125 overlapped by the capacitor electrode 126, and an insulating layer interposed between the capacitor electrode 126 and the common line 125. The storage capacitor Cst maintains the voltage charged in the liquid crystal capacitor when the corresponding thin film transistor is turned off, thereby preventing degradation of picture quality by parasitic capacitance Cgs.

The parasitic capacitance causes Δ V that is a D.C. voltage offset for an A.C. voltage applied to the liquid crystal. Also, the D.C. voltage offset generates bad effects such as flicker, image sticking, and uniformity of luminance, on an LCD device, so that it is necessary to decrease the change of Δ V by designing the storage capacitor.

As the capacitance of the capacitor increases, the picture quality improves. To improve the storage capacitance in the IPS mode LCD device according to the present invention, a first supplementary capacitor electrode 150 is provided below the second disclination prevention pattern portion 132, to form a first supplementary capacitor Cst'. And, a second supplementary capacitor electrode 151 is provided upper a first disclination prevention pattern portion 131, to form a second supplementary capacitor Cst'.

Figure 6A:
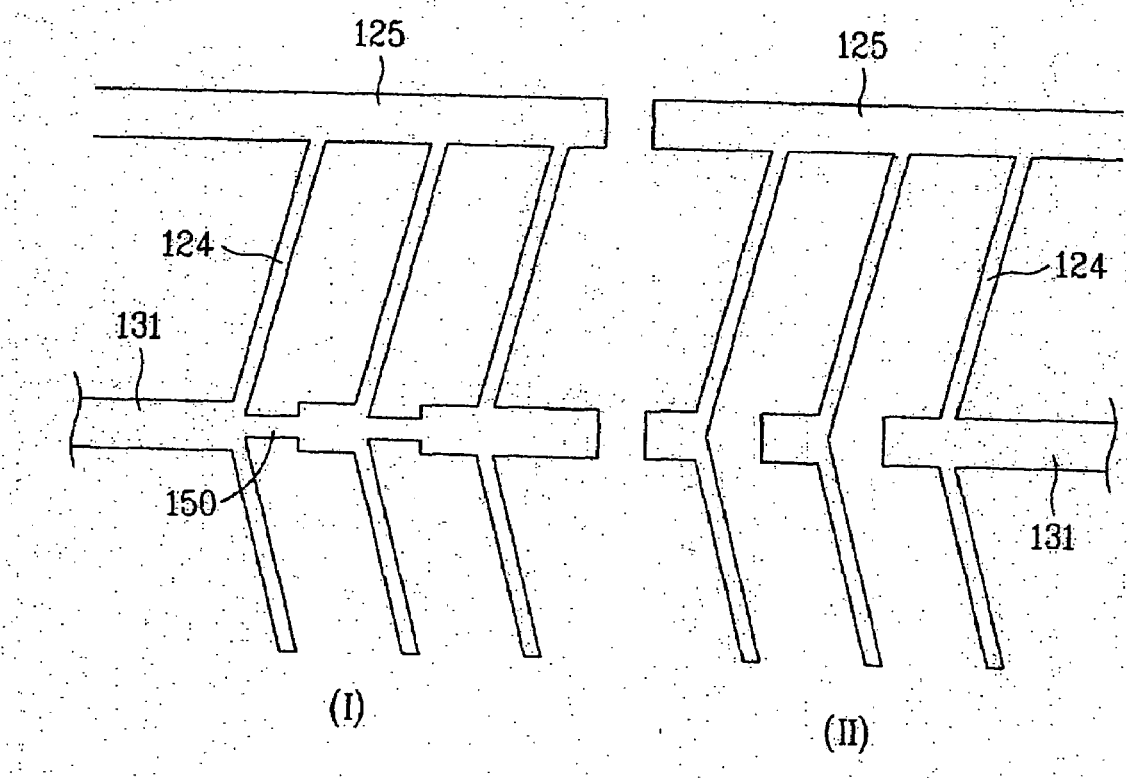
FIG. 6A (I) and (II) are plan views of a common electrode according to the present invention.

The first supplementary capacitor electrode 150 extended from the common electrode is formed in the bent portion of the common electrode 124, and the first supplementary capacitor electrode 150 is overlapped by the second disclination prevention pattern portion 132. Accordingly, as shown in FIG. 6A(I), the common electrode 124, extended from the common line 125, has the first disclination prevention pattern portion 131 at one side of the bent portion, and has the first supplementary capacitor electrode 150 at another side of the bent portion. The common electrode 124, the first disclination prevention pattern portion 131, and the first supplementary capacitor electrode 150 are integrally connected.

The first supplementary capacitor electrode 150 is formed of a low-resistance metal to shield the light. Also, in order not to effect the electric field formed between the second disclination prevention pattern portion 132 and the common electrode 124, the first supplementary capacitor electrode 150 is smaller than the second disclination prevention pattern portion 132.

Meanwhile, a gate insulating layer (113) is formed on an entire surface of the substrate including the gate line 112, whereby a gate line layer is insulated from a data line layer. Furthermore, a passivation layer (116) is formed on the entire surface of the substrate including the data line 115, so that the data line layer is insulated from the pixel electrode.

As depicted in FIG. 5, the gate insulating layer 113 is formed of an inorganic insulating material such as silicon nitride $SiN_x$ or silicon oxide $SiO_x$ by PECVD (plasma enhanced chemical vapor deposition) method. Also, the passivation layer 116 is formed by depositing an inorganic insulating layer such as silicon nitride $SiN_x$ or silicon oxide $SiO_x$ or by coating an organic insulating layer such as BCB (BenzoCycloButene) or acrylic resin.

Referring to FIG. 4, the thin film transistor TFT includes a gate electrode 112a, the gate insulating layer, a semiconductor layer 114, and source and drain electrodes 115a and 115b, whereby the thin film transistor TFT controls the turning-on/off of voltage applied to the unit pixel region. The gate electrode 112a extends from the gate line 112, and the gate insulating layer is formed on the entire surface of the substrate including the gate electrode 112a. Also, the semiconductor layer 114 is formed by sequentially depositing an amorphous silicon (a-Si) and an n-type a-Si on the gate insulating layer above the gate electrode, wherein the n-type a-Si is made by implanting impurity ions to the amorphous silicon. The source and drain electrodes 115a and 115b are integrally formed with the data line 115 and overlap both sides of the semiconductor layer 114.

In FIG. 5, the insulating layer interposed between the capacitor electrode 126 of the storage capacitor Cst and the common line 125 serves as a deposition layer of the gate insulating layer 113 and the passivation layer 116. Also, the insulating layer interposed between the second disclination prevention pattern portion 132 of the first supplementary capacitor Cst' and the first supplementary capacitor electrode 150 serves as a deposition layer of the gate insulating layer 113 and the passivation layer 116.

As shown in FIG. 6A (I), the gate line 112, the gate electrode 112a, the common line 125, the common electrodes 124, the first disclination prevention pattern portion 131, and the first supplementary capacitor electrode 150 are formed together on the same layer in a method of depositing and patterning the low-resistance metal, such as, copper Cu, aluminum Al, aluminum neodymium AlNd, molybdenum Mo, chrome Cr, titanium Ti, tantalum Ta, molybdenum-tungsten MoW, by sputtering. The common line 125, the common electrodes 124, the first disclination prevention pattern portion 131, and the first supplementary capacitor electrode 150 are integrally formed and the gate line 112 is integrally formed as one with the gate electrode 112a. The common line 125, the common electrodes 124, the first disclination prevention pattern portion 131 may also be formed without the first supplementary capacitor electrode 150 as illustrated in FIG. 6A (II).

Figure 6B:
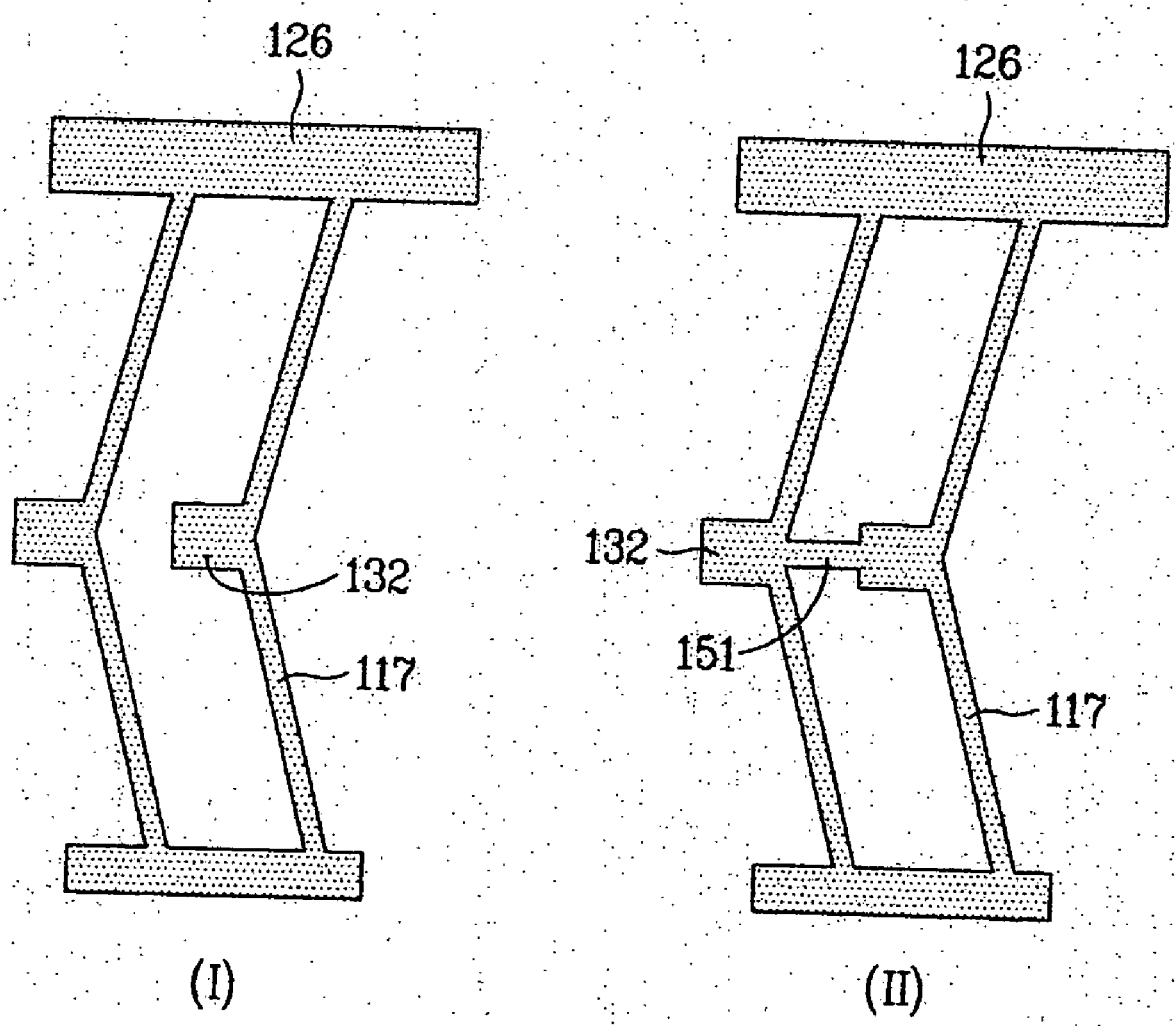
FIG. 6B (I) and (II) are a plan views of a pixel electrode according to the present invention.

As shown in FIG. 6B(I), the pixel electrode 117, the capacitor electrode 126, and the second disclination prevention pattern portion 132 are formed together on the same layer, in a method of depositing and patterning the transparent conductive metal having the high transmittance, such as ITO (indium-tin-oxide) or IZO (indium-zinc-oxide), by sputtering. The pixel electrode 117, the capacitor electrode 126, and the second disclination prevention pattern portion 132 are integrally formed. A second supplementary capacitor electrode 151 may also be integrally connected with the capacitor electrode 126, pixel electrode 117, and second disclination prevention pattern portion 132 as illustrated in FIG. 6B(II).

The common electrode 124 and the pixel electrode 117 may be formed in a zigzag pattern substantially parallel to each other. The common electrode 124 and the pixel electrode 117 may be bent at several portions of the unit pixel region or in the center of the unit pixel region at one time.

Thus, it is possible to improve the storage capacitance and to form the 2-domain S-IPS structure to prevent disclination on the thin film transistor array substrate.

Although not shown, the thin film transistor array substrate is bonded to a facing color filter substrate, wherein the color filter substrate includes R/G/B color filter layers arranged in regular order to obtain various colors, and a black matrix layer of shielding the light and dividing R/G/B cells. A liquid crystal layer having dielectric anisotropy is formed between the color filter substrate and the thin film transistor array substrate.

In the aforementioned IPS mode LCD device, a driving voltage is applied to the plurality of thin film transistors TFT, and the pixel electrodes of the same number are activated. Thus, the liquid crystal molecules are aligned by the electric field formed substantially in parallel to the substrates between the pixel electrode and the common electrode display the image by controlling the light transmittance.

As mentioned above, the IPS mode LCD device according to the present invention the following advantages:

In the IPS mode LCD device according to the present invention, the first supplementary capacitor electrode integrally formed with the common electrode is overlapped with the second disclination prevention pattern portion integrally formed with the pixel electrode, thereby improving the storage capacitance. And, the second supplementary capacitor electrode is overlapped with the first disclination prevention pattern portion, thereby improving the storage capacitance.

Also, the first and second disclination prevention pattern portions are formed in the bent portion of the pixel electrode and the common electrode so that it is possible to align the liquid crystal molecules to a desired direction, thereby realizing the 2-domain IPS mode LCD device of preventing the disclination.

In an alternate embodiment, the gate line may have a bent structure that is substantially perpendicular to a data line having a structure containing no bent portions. In this scenario, the bent portions of the common electrode 124 and the pixel electrode 117 are bend towards the gate line 112.

Alternately, the gate line may have a bent structure that is substantially perpendicular to a data line having bent portions. In this scenario, the bent portions of the common electrode 124 and the pixel electrode 117 may be bend towards either the gate line or data line.

It will be apparent to those skilled in the art that various modifications and variations can be made in the present invention. Without departing from the spirit or scope of the invention. Thus, it is intended that the present invention covers the modifications and variations of this invention provided they come within the scope of the appended claims and their equivalents.

What is claimed is:

1. An IPS mode LCD device comprising:
   a gate line on a substrate along one direction;
   a common electrode having a bent portion;
   a first disclination prevention pattern portion extended from the bent portion of the common electrode toward one side of the common electrode;
   a data line substantially perpendicular to the gate line;
   a thin film transistor at a crossing portion of the gate and data lines;
   a pixel electrode connected to a drain electrode of the thin film transistor, the pixel electrode having a bent portion and being formed substantially parallel to the common electrode;
   a storage electrode extended from the pixel electrode and overlapping a common line;
   a second disclination prevention pattern portion extended from a bent portion of the pixel electrode toward one side of the pixel electrode;
   a first supplementary capacitor electrode extended from the bent portion of the common electrode toward the one side of the common electrode,
   wherein the first supplementary capacitor electrode is a different size than the first disclination prevention pattern portion.

2. The IPS mode LCD device of claim 1, wherein the second disclination prevention pattern portion overlaps the first supplementary capacitor electrode.

3. The IPS mode LCD device of claim 1, further comprising a second supplementary capacitor electrode extended from the one side of the pixel electrode.

4. The IPS mode LCD device of claim 3, wherein the first disclination prevention pattern portion overlaps the second supplementary capacitor electrode.

5. The IPS mode LCD device of claim 3, wherein a second supplementary capacitor is formed of the second supplementary capacitor electrode, the first disclination prevention pattern portion, and an insulating layer interposed between the second supplementary capacitor electrode and the first disclination prevention pattern portion.

6. The IPS mode LCD device of claim 3, wherein the second supplementary capacitor electrode is smaller than the first disclination prevention pattern portion.

7. The IPS mode LCD device of claim 1, wherein the gate line has a bent portion.

8. The IPS mode LCD device of claim 7, wherein the bent portions of the common electrode and pixel electrode bend towards the data line.

9. The IPS mode LCD device of claim 1, wherein the gate line has a bent portion.

10. The IPS mode LCD device of claim 9, wherein the bent portions of the common electrode and the pixel electrode bend towards the gate line.

11. The IPS mode LCD device of claim 1, wherein the gate line and the data line have bent portions.

12. The IPS mode LCD device of claim 11, wherein the bent portions of the common electrode and pixel electrode bend towards one of the gate line and data line.

13. The IPS mode LCD device of claim 1, wherein a common line and the common electrode are formed on a same layer as the gate line.

14. The IPS mode LCD device of claim 1, wherein the pixel electrode is formed integrally on the common line, to form a storage capacitor.

15. The IPS mode LCD device of claim 1, wherein a first supplementary capacitor is formed of the first supplementary capacitor electrode, the second disclination prevention pattern portion, and an insulating layer interposed between the first supplementary capacitor electrode and the second disclination prevention pattern portion.

16. The IPS mode LCD device of claim 1, wherein the first supplementary capacitor electrode is smaller than the second disclination prevention pattern portion.

17. The IPS mode LCD device of claim 1, further comprising a gate insulating layer on an entire surface of the substrate including the gate line, and a passivation layer on an entire surface of the substrate including the data line.

18. The IPS mode LCD device of claim 1, wherein the first supplementary capacitor electrode is a smaller size than the first disclination prevention pattern portion.

* * * * *